(12) United States Patent
Jørgensen et al.

(10) Patent No.: US 12,495,295 B2
(45) Date of Patent: Dec. 9, 2025

(54) PACKET TRANSFER

(71) Applicant: Onomondo ApS, Copenhagen K (DK)

(72) Inventors: Henrik Aagaard Jørgensen, Copenhagen N (DK); Michael Karlsen, Copenhagen NV (DK)

(73) Assignee: Onomondo ApS, Copenhagen K (DK)

( * ) Notice: Subject to any disclaimer, the term of this patent is extended or adjusted under 35 U.S.C. 154(b) by 435 days.

(21) Appl. No.: 17/904,210

(22) PCT Filed: Feb. 12, 2021

(86) PCT No.: PCT/DK2021/050040
§ 371 (c)(1),
(2) Date: Aug. 12, 2022

(87) PCT Pub. No.: WO2021/160231
PCT Pub. Date: Aug. 19, 2021

(65) Prior Publication Data
US 2023/0089071 A1    Mar. 23, 2023

(30) Foreign Application Priority Data
Feb. 13, 2020  (DK) .............................. PA202070083

(51) Int. Cl.
*H04W 12/037*  (2021.01)
*H04W 12/069*  (2021.01)
*H04W 12/72*   (2021.01)

(52) U.S. Cl.
CPC ....... *H04W 12/037* (2021.01); *H04W 12/069* (2021.01); *H04W 12/72* (2021.01)

(58) Field of Classification Search
CPC .. H04W 12/037; H04W 12/72; H04W 12/069
See application file for complete search history.

(56) References Cited

U.S. PATENT DOCUMENTS

| 2004/0090990 | A1* | 5/2004 | Charlot | H04L 65/1106 370/466 |
| 2005/0043041 | A1* | 2/2005 | Ignatius | H04L 9/40 455/456.2 |

(Continued)

FOREIGN PATENT DOCUMENTS

WO    2020001781 A1    1/2020

*Primary Examiner* — William S Powers
(74) *Attorney, Agent, or Firm* — Noréns Patentbyrå AB (57) ABSTRACT

Interrelated computing devices and systems require ever more powerful devices to meet growing encryption demands. This is improved by providing a computer-implemented method comprising: receiving a packet (50) from a user equipment (10) through an access network (20) of a telecommunications network (1), the packet (50) having a subscriber identity of said user equipment (10) and a telecom encryption layer (52) compliant with cryptographic protocols of the telecommunications network (1); decrypting the telecom encryption layer (52) of said packet (50) according to protocols of said telecommunications network (1) using said subscriber identity in a network core (30) of said telecommunication network (1); finding a predetermined action stored in an action database (31) of said network core (30) pre-associated with said subscriber identity of said packet (50); and performing said predetermined action on said packet (50) in said network core (30).

22 Claims, 4 Drawing Sheets

(56) References Cited

U.S. PATENT DOCUMENTS

| | | | |
|---|---|---|---|
| 2009/0234972 A1* | 9/2009 | Raghu | H04L 67/01 |
| | | | 709/246 |
| 2011/0032868 A1* | 2/2011 | Huang | H04L 12/4633 |
| | | | 370/328 |
| 2012/0147834 A1* | 6/2012 | Zisimopoulos | H04W 8/12 |
| | | | 370/328 |
| 2012/0163256 A1* | 6/2012 | Kang | H04L 63/18 |
| | | | 370/352 |
| 2013/0343538 A1 | 12/2013 | Mizikovsky et al. | |
| 2014/0140344 A1* | 5/2014 | Krishnan | H04L 61/2517 |
| | | | 370/392 |
| 2016/0072787 A1* | 3/2016 | Balabine | H04L 63/12 |
| | | | 726/6 |
| 2016/0373343 A1* | 12/2016 | Lundqvist | H04L 45/24 |
| 2017/0093588 A1 | 3/2017 | Mizikovsky et al. | |
| 2018/0062995 A1* | 3/2018 | Naar | H04L 63/166 |
| 2018/0063076 A1* | 3/2018 | Field | H04L 63/08 |
| 2018/0288179 A1 | 10/2018 | Bhatia et al. | |
| 2018/0310182 A1* | 10/2018 | Holtmanns | H04W 4/24 |
| 2019/0068406 A1 | 2/2019 | Eperiesi-Beck | |
| 2019/0098089 A1 | 3/2019 | Shim et al. | |
| 2019/0166088 A1 | 5/2019 | Krochik et al. | |
| 2019/0234972 A1* | 8/2019 | Oh | H04W 4/80 |

* cited by examiner

PACKET TRANSFER

FIELD OF THE INVENTION

The invention relates to a method for improved data handling and packet routing and manipulation in a packet-switched network core of a telecommunications network, and a computer system, program, and physical storage medium for carrying out such method.

BACKGROUND OF THE INVENTION

Prime among new developments in automation, internet of things (IoT) and the industrial revolution 4.0 are embedded sensors to allow device- and process monitoring. Increasing usage stability and cost reductions make such sensor devices cost-effective in ever more industries. Such devices have a microcontroller, a memory, and often an antenna as well, for communication over a network.

Software installed on such devices are made obsolete by ever-increasing encryption requirements of the networks and data packet recipients. So-called 'day zero' vulnerabilities are just one example of an event that may expose the sensor device to malicious parties, another being the increasing computing powers of hackers. Today, this is solved by software updates and installation of new and better sensor devices.

Embedded sensors are often located remotely and thus cannot be powered via cable. Conventionally, this is solved by using batteries in the sensors to provide power for sensing, data manipulation and data packet transmission. With need for improved encryption to fend off malicious parties, greater computing power and data transmission is needed, further draining the battery power and increasing device cost. Further, if a malicious party gains access to a sensor device, they may tamper with it to find both the recipient address as well as find keys to compromise the encryption of potentially several devices. This is solved by using sufficiently strong encryption and/or by making the sensor devices unreachable.

Therefore, there is a need for a solution to increase the performance, security and flexibility of remote sensor devices.

SUMMARY OF THE INVENTION

In one aspect, there is provided a computer-implemented method comprising the steps:
receiving a packet from user equipment via an access network of a telecommunication network, the packet having a subscriber identity of said user equipment and being encrypted in the access network according to protocols of the telecommunication network,
decrypting said packet according to protocols of said telecommunication network using said subscriber identity in a network core of said telecommunication network, the method characterised by
finding a predetermined action stored in an action database of said network core pre-associated with said subscriber identity of said packet, and
performing said predetermined action on said packet in said network core.

In a second aspect, there is provided a computer-implemented method comprising the steps:
receiving a packet from user equipment via an access network of a telecommunication network, the packet having a subscriber identity of said user equipment and being encrypted in the access network according to protocols of the telecommunication network,
decrypting said packet according to protocols of said telecommunication network using said subscriber identity in a network core of said telecommunication network, the method characterised by
finding a predetermined action stored in an action database of said network core pre-associated with said subscriber identity of said packet, and
performing said predetermined action on said packet in said network core, where the predetermined action comprises:
replacing the subscriber identity in the packet with a second identifier from a mapping database, the second identifier being specific to the subscriber identity and useful for identifying and/or authenticating the user equipment by a recipient of the packet, after transmission over the public internet, or
producing a modified packet by modifying payload data of said packet.

Thereby, when regulation changes, when device firmware errors are identified, or when optimizations are made to the firmware, such improvements can be implemented centrally in the network core. Updates are then quick and cheap and instantly apply to all affected user equipment. By allowing such easy firmware updating, user equipment life is significantly increased, because the computational requirements of the firmware no longer rely on the computing power of user equipment. This further frees firmware designers from platform-specific work and hardware-level optimizations. Instead, the firmware can be made as efficient and effective as possible on one or a few larger systems.

For example, it is not uncommon for user equipment manufacturers to provide firmware updates for a specific product only for a few years, such as five or ten years, after which they will not guarantee that user equipment can still perform the necessary computational work to run the firmware adequately. By offloading the computational work to the network core, such updates can be performed centrally, and the computational work can grow without obviating the piece of user equipment.

Thereby, user equipment can be small, cheap and simple. It can further be user-friendly because it no longer needs firmware updates.

Further, user equipment can be built to take advantage of this computational offloading and can thus be produced without significant computing power in the first place. Such user equipment may then be very small, cheap, simple and may have significantly longer battery life.

Even further, legacy user/sensor equipment, which is nearing end of life or has been retired for computational reasons, can be retained or re-introduced to service by use of the method. This is achieved by installing updated firmware in the network core, and after receiving a packet from legacy equipment, performing any necessary legacy encryption decrypting, then finding and performing the predetermined action.

The subscriber identity is also termed the first identifier, where the mapped identifier is the second identifier.

Yet further, by mapping a mapped identifier to a subscriber identity, the method allows the network core to receive telecom specific packets and prepare them for transmission over the public internet. Such mapped identifier identifies the subscriber identity, and thus, when the packet is received in the private server such as a cloud database, the mapped identifier can be traced to the user equipment by consulting a matching mapping database. The second identifier can be a pre-shared key, a private key or login credentials, such as of a user.

This mapping allows the private server, such as a cloud server, to identify and authenticate the device and thus ensure that it is legitimate. Any credentials or keys can further be changed if they are compromised without needing to update firmware or software on any of the individual devices.

In an embodiment, the pre-associated action is adapted to work on top of a legacy packet produced with legacy firmware on user equipment. Legacy firmware is here firmware installed on devices that has since been taken out of firmware update cycles and has thus depreciated. Such legacy firmware may, among other inadequacies, not meet best practices like 128- or 264-bit encryption ciphers of Secure Sockets Layer (hereinafter SSL) or Transport Layer Security (hereinafter TLS). This adaptation can include the pre-associated actions decrypting any legacy encryption, or work with a legacy data format used by such legacy firmware, and/or it can comprise working on top of the legacy packet according to instructions that are designed to work through any legacy encryption.

A packet may comprise many parts. For the intents of the invention, a packet comprises at least a payload having data for use by an intended recipient. The packet may further have a header with metadata, such as receiver/destination information. The packet header may also have information relating to the packet sender. The packet sender may provide information on, or be identical to, the subscriber identity of user equipment that transmitted the packet. When the packet is encrypted, the header remains unencrypted, while the payload is encrypted. Regardless of whether the packet has a header or not, the packet can always be associated with a subscriber identity by a network operator either by using a header as discussed or by the packet being part of a data session associated with the subscriber identity.

By subscriber identity is principally meant the International Mobile Subscriber Identity (hereinafter IMSI) number, but it can be any code, number or other data that positively identifies user equipment or mobile equipment/sensor equipment, such as an integrated circuit card identifier (hereinafter ICCID), a subscriber identity/identification module (hereinafter SIM), subscriber identification module identity (hereinafter SIM ID), an international mobile equipment identity (hereinafter IMEI) number, or any such positively identifying information or number, an endpoint identifier (hereinafter EID), source Internet Protocol (hereinafter IP) address or any other such positively identifying information. In an embodiment, the subscriber identity is IMSI, SIM ID, ICCID, SIM or IMEI. In an embodiment, the subscriber identity positively identifies the subscriber, and can thus be for example a SIM ID or an IMSI number. In an embodiment, the subscriber identity is the IMSI number.

By public internet is meant the network that is commonly referred to as the internet, where certain cryptographic protocols have become norm and rule, such as SSL/TLS.

The terms mobile network and telecommunication network are used synonymously throughout the disclosure to denote any of the generations of telecommunication networks that service mobile devices throughout the world on a subscriber basis. The networks denoted need to have more than circuit-switched domains and are preferably packet-switched. As of this disclosure, at least 2G fall within this, as well as 3G, 4G, 5G and their intermediate generations.

Several telecommunications networks exist with partially overlapping functionalities and infrastructure, such as 2G, 3G, 4G and 5G. Common to all of these is that they are subscriber-based and operated as least in part by commercial parties, some of which install the access network infrastructure, the communication between the access network and/or the network core, or operate one or several services of the network core. Certain protocols are established for the communication on such an operator-driven network, such as encryption requirements and packet formats and/or structure. Satellite networks and networks incorporating satellites are also covered.

Any type or make of user equipment can be used with the invention. Useful examples are sensor equipment/sensor devices/sensor modules. Sensor equipment on container ships may measure temperature and pressure of sensitive cargo. The invention is beneficial there, not least because the devices are moving through different networks, but further because devices can thus be smaller and simpler, and lifetime of installed sensors can be extended.

Sensor equipment may be installed in wind turbines for continual sensing thus taking advantage of being small devices and/or with a longer battery life, as well as updating firmware without the need for a manual inspection and update. Military and police devices may benefit from the enhanced security. Other security-sensitive uses may be user devices used, where there is a risk or fear of packet interception, where the invention makes the packets tamper-resistant by obviating transmission metadata, such as destination.

In the following, the invention is described in detail through example embodiments thereof that should not be thought of as limiting to the scope of the invention.

In an embodiment, the method further comprises the step of transmitting the data packet over the public internet. Thereby, the packets are easily transmitted to a recipient over conventional channels while allowing sophisticated data manipulation in the network core. The packet is preferably transmitted over the public internet with best practices encryption relevant thereto, such as SSL and/or TLS. The packet is preferably transmitted to a destination determined by a recipient.

In an embodiment, the predetermined action comprises at least one of encrypting the packet according a public internet cryptographic protocol, or producing a modified packet by modifying packet data of said packet.

Thereby, the network core is leveraged to reduce computing needs on the user device, such as a sensor device, by providing treated data from the telecom network without requiring every user device to be able to perform this computing themselves. This allows cheaper, smaller and more reliable devices.

In an embodiment, the second identifier is a key or authenticator compliant with a public internet cryptographic protocol, such as a pre-shared key, a private key or login credentials. Thereby, the identity of the devices can be securely transmitted over the public internet without risk of device exposure even if the packet is compromised.

In one aspect, the invention relates to a computing unit comprising means for carrying out the steps of the method of the invention. Thereby, a system is provided that allows small, long-lasting and cheap user equipment by obviating the SSL/TLS encryption layer traditionally added on user equipment, while providing easier and better control in the network core. The packets are further made more tamper proof.

In one aspect, the invention relates to a computer program comprising instructions which cause the computing unit to carry out the steps of the invention, when the program is executed by a computing unit.

In one aspect, the invention relates to a computer-readable storage medium comprising instructions which cause the computing unit to carry out the steps of the invention, when executed by a computing unit.

Example A—Encryption

In an embodiment, the method further includes:
the predetermined action comprising encrypting the packet according to a public internet cryptographic protocol, and
optionally transmitting the packet over the public internet.

Thereby, user equipment does not need to perform computing-heavy encryption, while the packet is still encrypted for the internet, when this is relevant.

This has a cascade of benefits: it reduces necessary computing power on user equipment and thus device size and costs; it reduces telecom transmission requirements thus allowing the same payload to be transmitted, while using fewer packets and less total data volume; it reduces battery drain and thus battery size and costs, and so increases battery life; it obviates expensive and difficult firmware updates that are traditionally required to comply whenever encryption standards change; and it further avoids making the devices obsolete, when such firmware updates would otherwise no longer be possible on 'computing-light' user equipment.

Instead of the public internet, the encryption layer added can conform to any other arena, as long as the encryption layer complies with a specific channel/network, where the packet is intended to route through.

In an embodiment, said packet comprises encryption substantially only according to cryptographic protocols of the telecom network.

In an embodiment, the public internet cryptographic protocol is a Secure Sockets Layer protocol or a Transport Layer Security protocol. In an embodiment, the public internet cryptographic protocol is a Transport Layer Security protocol.

If necessary, some types of user equipment may still be programmed to perform a relatively simple encryption, which makes it difficult or impossible for an operator of the telecom network to retrieve the plaintext packet, or the simple encryption may be performed for other reasons. The encryption applied in the network core will then simply be added 'on top' of this receiver encryption layer. The reduction in data transmission requirement, which provides the mentioned benefits, remains.

In an embodiment, any further encryption layer of the received packet besides the telecom encryption layer has a key length of 127 bits or fewer. In an embodiment, any further encryption layers besides the telecom encryption of the received packet has a key length of 256 bits or fewer, 255 bits or fewer, 250 bits or fewer, 195 bits or fewer, 190 bits or fewer, 127 bits or fewer, 125 bits or fewer, 120 bits or fewer, 111 bits or fewer, 110 bits or fewer, 105 bits or fewer, 55 bits or fewer, 50 bits or fewer, 39 bits or fewer, 35 bits or fewer, 15 bits or fewer, 7 bits or fewer, or 3 bits or fewer. Thereby, more payload data can be transmitted for every packet thus reducing transmission requirements, calculation time, battery drain and so on, on the network and on the user equipment.

Example B—Packet Rerouting

In an embodiment, the method further includes:
the packet optionally comprising an original packet destination, then said pre-determined action comprises
supplying the packet with a recipient packet destination being different from, and replacing, any original packet destination of the packet, and
optionally transmitting the packet to the recipient packet destination.

The packet may originally have no destination address at all, or it may have a destination address within the network core, or it may have a destination address outside the network core. The operator picks up the packet, evaluates it against the action database, and swaps out or provides the packet with a predetermined recipient destination.

In an embodiment, said recipient packet destination is reached through the public internet.

This allows user equipment not to have information on where its packets are intended to be transmitted. Traditional user equipment has sophisticated firmware installed with encryption protocols and addresses, both of which are useful information to a malicious third party wanting to gain access to the private server. If a malicious third party gains control over conventional user equipment, such party can reverse engineer the firmware or use it directly and may gain access to the private server.

In an embodiment, the packet as received has no destination, and the pre-determined action comprises supplying a recipient packet destination to said packet.

In an embodiment, the packet as received has an original destination, and the pre-determined action comprises replacing said original packet destination with a recipient packet destination being different from said original destination.

When the packet destination is handled outside of user equipment, but within the network core, no firmware needs to be installed on user equipment. Instead, any such firmware can be installed in the network core, such as the action database. Therefore, there is no firmware to tamper with to find either addresses or encryption protocols. In an embodiment, the data transmitted from such user equipment is as untreated as conveniently possible, such as primary sensor data. For example, temperature sensor data can be transmitted as conductivity measurements between two hardware-dependent arbitrary points, after which the transformations to degrees centigrade (raw sensor data) is performed within network core. This would strip a given piece of user equipment of as much context as possible and make tampering even less useful.

In this disclosure, destination and address are used interchangeably to describe the intended end point of the packet transmission. The recipient destination/recipient address can be reached either through the public internet as described for example A, or through any other convenient channel, such as through the telecom network itself.

In an embodiment, the recipient packet destination may be a null destination. In other words, in this embodiment, the invention relates to retaining the packet, and either keeping it or deleting it. This packet retaining is preferably one of a set of actions possible for a given packet, which packet retaining then depends on packet or payload analysis. The packet retaining is performed in the network core.

Example C—Payload Modification

In an embodiment, the method further includes:
producing a modified packet by modifying packet data of said packet, and
optionally transmitting the modified packet to a recipient.
Modifying encompasses changing by transformation, addition, subtraction and other types of changing. Modifying the packet data comprises modifying the payload data, and modifying other packet data, such as header, padding, and/or destination.

In an embodiment, modifying said packet comprises modifying said payload data. Modifying the payload covers several actions that can be taken on the packet, some of which are described in the following.

In an embodiment, the received packet comprises raw sensor data or primary sensor data.

In an embodiment, modifying the packet comprises transforming primary sensor data of the packet to raw sensor data.

Primary sensor data is here hardware-dependent data, such as binary data describing conductivity measurements between two hardware-dependent arbitrary points. Such a sensor circuit conductivity may for example map to a temperature of a temperature sensor, or the brightness of an environment of a light or motion sensor. Raw sensor data is here the hardware-independent data, such as numbers representing a temperature in any unit, such as Celsius, Kelvin or Fahrenheit, or lumen for brightness/light. Transforming primary sensor data to raw sensor data then comprises consulting a sensor hardware-specific table/function, such as mapping conductivity and temperature or conductivity and brightness. Such transformation is traditionally performed by a sensor module microprocessor.

By transforming primary sensor data to raw sensor data in the network core, user equipment can be smaller, lighter and cheaper than user equipment performing its own calculations. The packets and payload data may further be more tamper-proof, since such primary sensor data is hardware-dependent and meaningless without context.

In an embodiment, modifying the payload data comprises transforming raw sensor data to cleaned sensor data by cleaning the raw sensor data for outliers and/or error readings. This can be performed on top of raw sensor data provided in the packet by the user equipment, or it can be performed on raw sensor data produced from primary sensor data in the network core. By cleaning raw sensor data and producing cleaned data, useless data can be removed, reducing transmission requirements.

In an embodiment, said predetermined action comprises producing a modified packet, where said modified packet is produced by analysing payload data of said packet and modifying said packet data based on said analysis.

Thereby, sophisticated analysis can be performed on data transmitted from the user device. For example, this allows transmitting errors or emergency signals differently based on specific values which speeds delivery up qualitatively compared to a situation where the data has to be transmitted over the public internet to a private server for data analysis. Further, where the pre-determined action comprises changing the recipient based on packet data analysis, such rerouting further speeds up recipient reception of packets qualitatively.

In an embodiment, the payload data is subjected to analysis for tendencies, such as statistical analysis or grouping of results. In an embodiment, the payload data is subjected to statistical analysis for tendencies, such as finding/assessing a median value, a normal value or an average value.

In an embodiment, a test is performed on the payload, and if it has certain values, one change is performed, and if it has other values, another change is performed. A simple over/under test can be performed, or complex calculations can be performed whose functions change as a result of the input values.

In an embodiment, packet data is compressed based on data analysis of the packet payload. For example, if certain sensor readings repeat the same values, these may be bundled into a single reading with several timestamps.

In an embodiment, packets are received and analysed, and data is retransmitted from the network core without regard to original packet divisions.

In an embodiment, extremely taxing calculations are performed in the network core on the packet. Such calculations may be cost-prohibitive to implement in conventional user equipment. In an embodiment hereof, blockchain calculations are performed for a packet in the network core. Thereby, sensor data can be tracked-, and be gathered and processed in a tamper-resistant manner.

In an embodiment, modifying the packet consists of modifying the packet payload.

Example D—User Channel

In an embodiment, the method further includes providing a publicly accessible communication channel to said action database, where said subscriber identity belongs to a user profile, and where a user accessing said communication channel using said user profile is allowed to modify the pre-determined action associated with the subscriber identity belonging to said user profile.

The channel provides a way for equipment owners and managers to control the behaviour of the equipment. The channel can be a user-friendly web page with a login behind which login is a user page with information on all subscriber identities belonging to the user. It can also be an address accessible through other means, such as accessed by the public internet through other means, such as providing application programming interfaces. A user profile may have a plurality of subscriber identities and a plurality of pre-determined actions.

Thereby, a user, such as an equipment operator or owner can access and modify the programming of the network core to install updates or change user equipment packet modification rules as they see fit. Such changes take effect instantaneously across all user equipment and without risk of errors on device updates, etc. In an embodiment, the modification of pre-determined actions comprises a user-friendly interface allowing selection among alternative actions. In an embodiment, the modification of pre-determined actions comprises providing application programming interfaces with which a user can interface a firmware.

This allows convenient and user-friendly control of pre-determined actions, while retaining lightweight and tamper-resistant packet transmissions on the telecom network.

BRIEF DESCRIPTION OF THE DRAWINGS

In the following, example embodiments are described according to the invention, where.

DETAILED DESCRIPTION

In the following, the invention is described in detail through embodiments thereof that should not be thought of as limiting to the scope of the invention.

Figure 1:
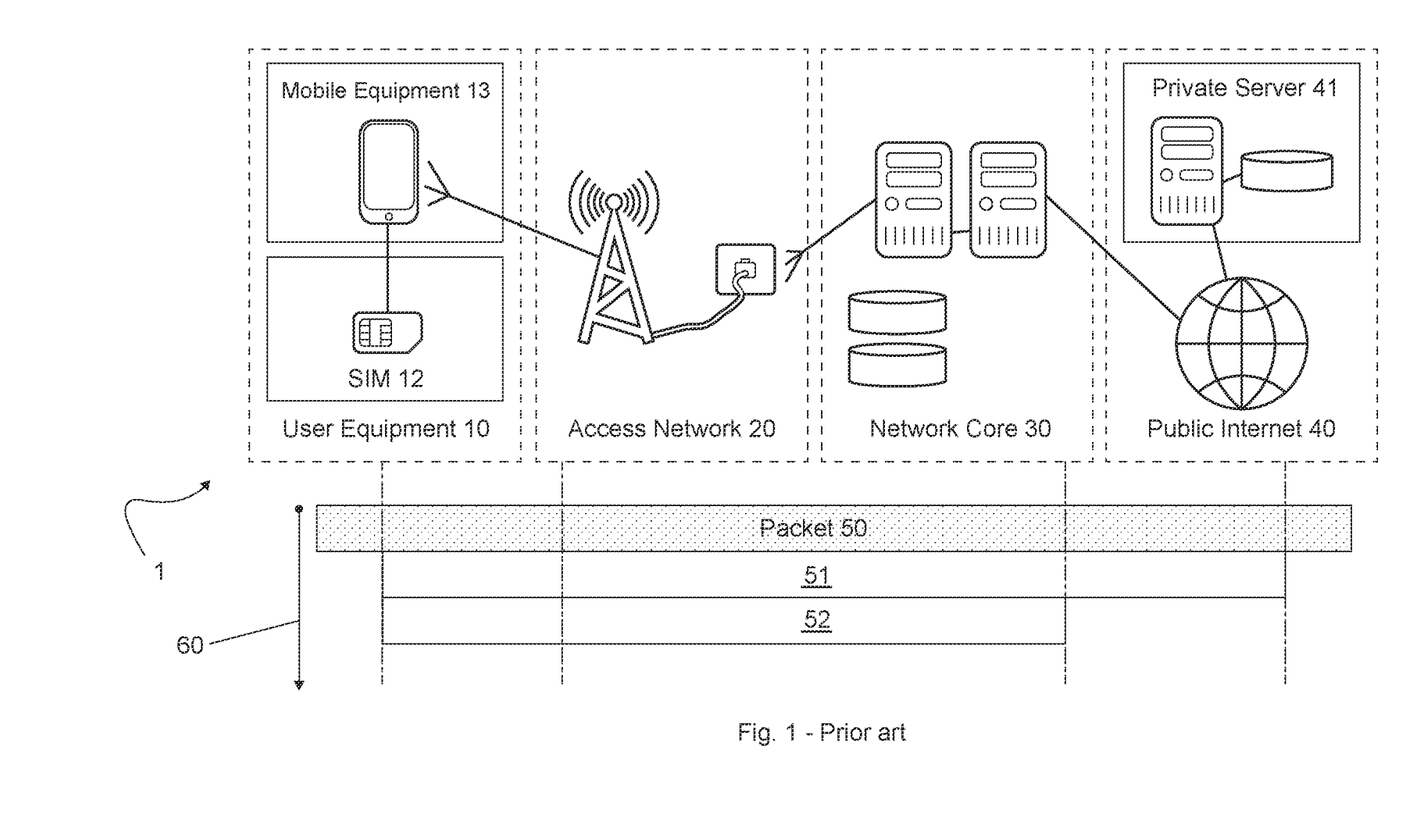
FIG. 1 is a prior art schematic view of a packet transfer over a mobile network.

FIG. 1 is a schematic view of a conventional telecommunication/telecom network 1, such as a broadband telecom network, and a packet 50 transmitted through the telecom network. The telecom network 1 comprises user equipment 10 which communicate with access networks 20. The access networks 20 can be radio access networks and connect user equipment 10 to a network core 30 which performs the telecom network actions on transmitted packets 50. For packets transmitted further, such as to the public internet 40, this is also reached through the network core 30. Private servers 41 can be reached through the public internet 40.

User equipment 10 has a SIM 12 for identifying the subscriber on the network which is important for billing, network access and other protocols internal to the functioning of the telecom network 1. Such SIM 12 can be a physical card or an embedded SIM and conveniently comprises, among other elements, an international mobile subscriber identity (IMSI) which identifies the subscriber uniquely. User equipment 10 can be a mobile device such as a smartphone or tablet. In the following description, it will be assumed to be a sensor module adapted to transmit sensor data from remote areas, where telecom networks 1 provide the best or only coverage. Such sensor module can be mounted in a container to transmit live temperature data, location data, images or other such types of sensor data that may be valuable to retrieve continuously or intermittently.

A data packet 50 can be a piece of sensor data produced by mobile equipment 13 sensor. When user equipment 10 thus creates a packet 50 for a distant recipient to be transmitted over a telecom network 1 according to the prior art, the following is the conventional process. The packet 50 is prepared for transmission to a recipient on a private server 41.

Initially, the packet 50 is prepared on a piece of user equipment 10, including adding an internet encryption layer 51. Such piece of user equipment 10 is pre-programmed to apply this encryption by using firmware typically developed by private server 41 operators. To comply with stringent public internet 40 encryption requirements, this internet encryption layer 51 is both computing-heavy and data-heavy. Such encryption is typically SSL or TLS.

The packet comprises a payload and a recipient address by use of which the telecom network is able to route the packet through a series of transmissions and to the recipient destination in the end. Different protocols are required for a subscriber network such as a broadband telecom network 1 to serve different encryption needs, such as ensuring that no one can access the contents of the packet 50 while on the network. A telecom encryption layer 52 is applied on the piece of user equipment using the subscriber identity or device identity. This can for example be the SIM or IMSI or ICCID.

As the packet 50 travels towards the private server 41, it passes through the network core 30, where the subscriber identity is used again by the service provider of the specific piece of user equipment 10 to unencrypt the telecom encryption 52.

After unencrypting the telecom encryption layer 52, the packet 50 still has the internet encryption layer 51 and is then transmitted via the public internet 40 to the private server 41. On the private server 41, the internet encryption 51 is then decrypted using the firmware.

Now, the receiver on the private server 41 has unbundled the packet 50 for sensor data verification, analysis and other types of data manipulation. Several packets 50 are then transmitted, and payload data of the packets, when unencrypted, may make up continuous sensor readings, interval readings and so forth such as part of a data transmission session, and packets may comprise a part of a reading or several readings or any other part of a data file, according to what is practical or the standard on the network.

The encryption layers 51, 52 increase the packet size significantly thus increasing the load on user equipment 10 and telecom network 1 resources. The difference between an unencrypted packet and an encrypted packet can be at least a factor 1:10 or 1:100 in data size. Further, tightening encryption standards necessitates larger and larger user equipment 10 capabilities to keep up with the needed computing power.

Figure 2:
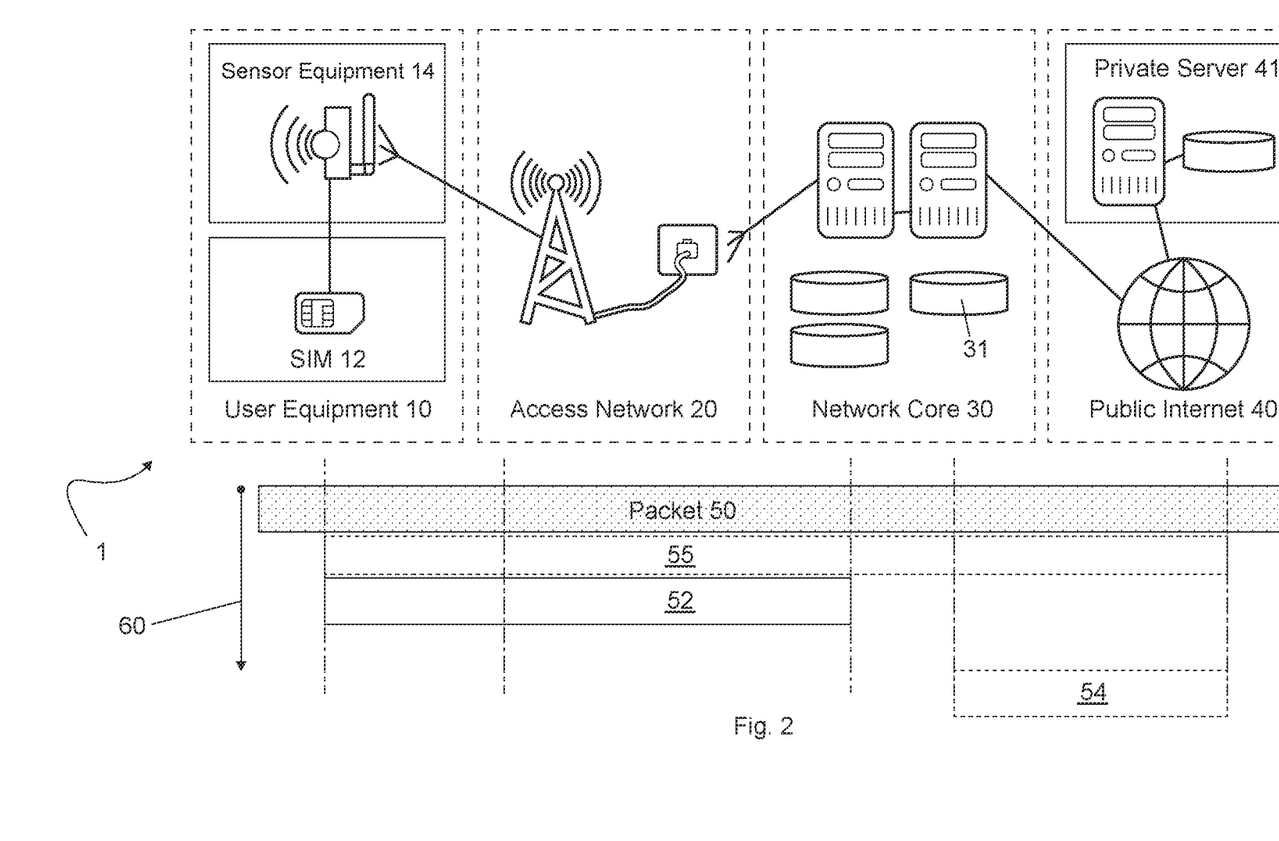
FIG. 2 is a schematic view of a packet transfer over a mobile network according to one embodiment of the invention.

FIG. 2 illustrates the packet transmission over a telecom network 1 according to the invention. The telecom network 1 itself is substantially the same. The method of the invention is considered to be useful in many situations, one of which is when being used with sensor equipment 14, being remotely located, or in locations with intermittent WIFI or internet coverage, where a telecom network 1 can provide stability or bandwidth. This also illustrates the point that such sensor equipment may be installed fixedly.

As can be seen, user equipment 10 is not required to provide an internet encryption layer. Instead, the telecom encryption layer 52 is used alone to retain adequate encryption through the telecom network 1. In the network core 30, an action database 31 is provided, which comprises a list of subscriber identities and a matching list of actions. When a packet 50 is received in the network core, the telecom encryption layer 52 is decrypted, and the action database 31 is consulted to identify the packet sender and match it with a pre-determined action or set of actions.

The packet 50 may still be encrypted on a piece of user equipment 10 according to a recipient encryption layer 55 to make the payload tamper-resistant. However, this encryption does not need to comply with internet standards. Further, if such recipient encryption layer 55 is provided, the analysis and actions performed on the packet 50 is likewise adapted to take it into account. In other words, any encryption remaining on the packet 50, after telecom encryption has been decrypted, may be transparent as concerns the actions performed in the network core 30. This does not mean that the operator of the network core 30 can understand the packet 50, but only that the operator of the network core 30 has been supplied with tools that work on the packet 50 through, or on top of, any remaining encryption layers 55.

In an embodiment, the subscriber identity of the packet is replaced with a mapped identifier that has a predetermined mapping to a specific subscriber identity and adapted to be useful or convenient for when transmitting over the public internet. Such a mapped identifier can be a cryptographic pre-shared key, a cryptographic private key, or even user log-in credentials. In any case, when the recipient receives the packet, the mapped identifier allows finding the user equipment through its pre-determined relationship with the subscriber identity.

For packets 50, which are transmitted to a private server 41 via the public internet 40, such set of actions preferably include applying a recipient encryption layer 54 being preferably an internet encryption layer conforming to a cryptographic protocol of the public internet, such as SSL or TLS.

Many further options are made possible by providing a computing unit between the user equipment 10 of a telecom network 1 and a recipient. Such computing unit is placed in the network core 30 and either works through any encryption layers of the packet 50 or applies a recipient encryption layer 54 to the packet. It does this at a point, when minimal encryption is needed, and before the encryption requirements become the most taxing—the public internet 40.

One way the invention works is by expanding the computing power of user equipment to include the computing power of the network core 30.

Figure 3:
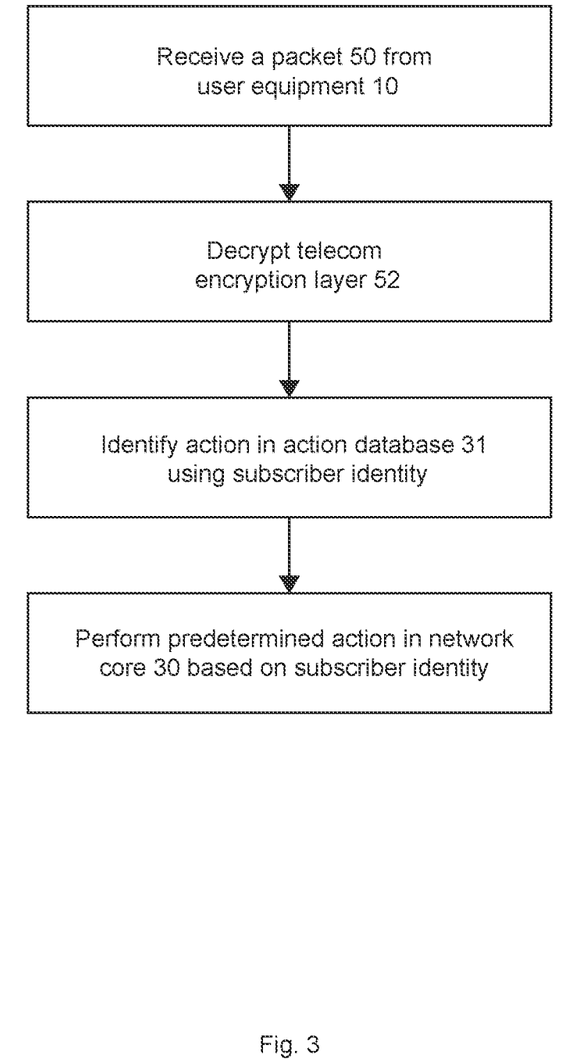
FIG. 3 is a flow diagram of a packet transfer according to one embodiment of the invention.

FIG. 3 is a flow diagram of an embodiment method of the invention. The method starts by receiving, in a network core 30, a packet 50 from user equipment 10. The packet sender is a subscriber on the network, and the packet may have a destination, such as a private server of the owner of the specific piece of user equipment 10 or a subcontractor thereof. Alternatively, a telecom network operator can always intercept the packets of its subscribers, and a packet without a destination will thus still arrive at the network core 30.

Next, the telecom encryption layer 52 is decrypted using protocols of the telecom network, such as using the subscriber identity to decrypt the packet. Any decryption scheme, which matches the encryption protocols of a telecom network, may be used with the decryption step. This ensures that the method complies with regulations of the telecom network and prepares the packet for further processing.

An action database 31 stored in the network core 30 is then consulted. The subscriber identity is used to match up to a series of predetermined actions to be performed for that specific subscriber identity. These actions are designed by, or for, a recipient based on the specific implementation of the piece of user equipment. Sensor data from a sensor module on a container ship will have one series of actions performed before being transmitted to the ship or container manager, while a pump operation sensor may require different sets of actions before being transmitted to a pump operator.

After the action or list of actions has been identified, the actions are then performed in the network core of the telecom network.

For most packets, they are then transmitted to a recipient destination.

Figure 4:
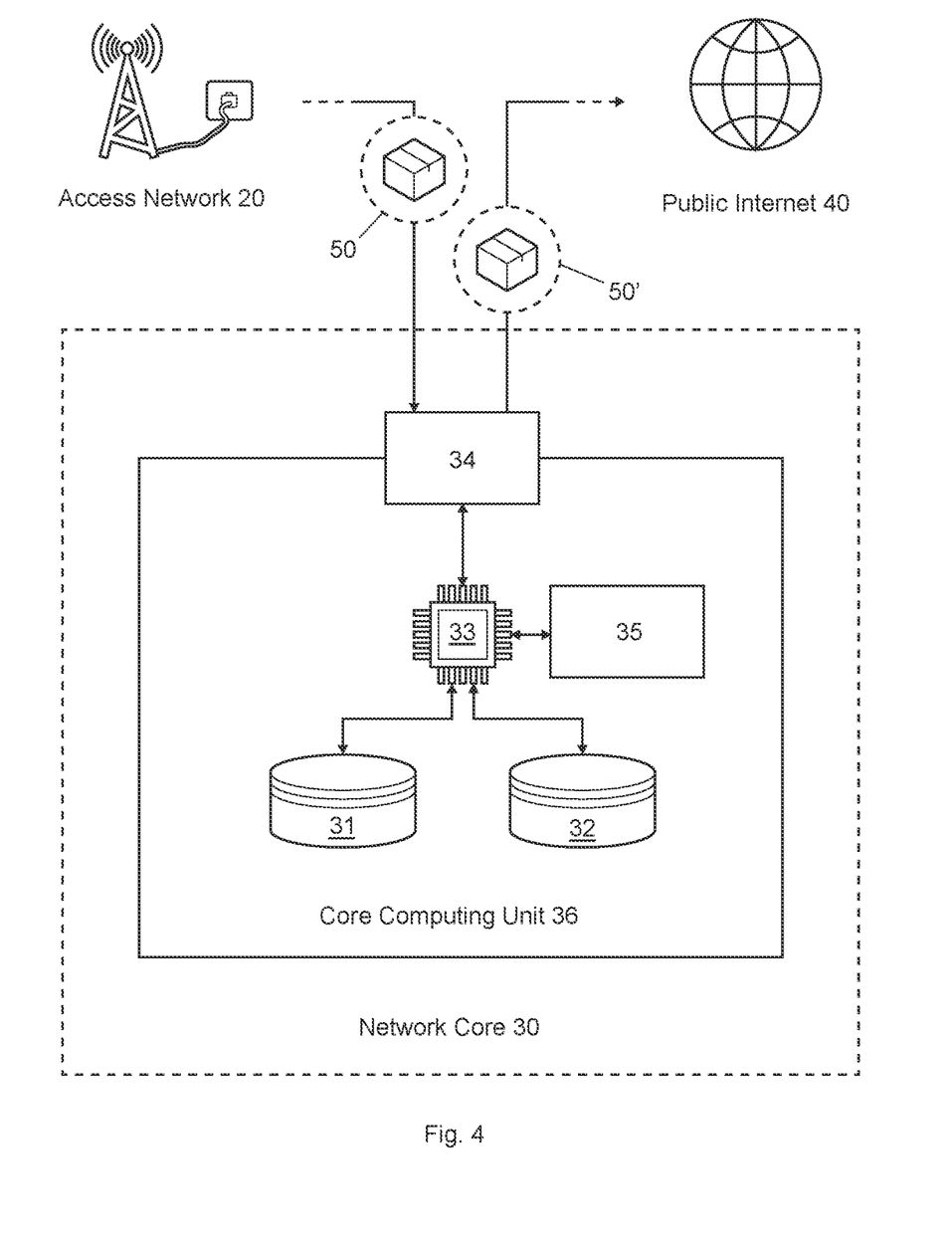
FIG. 4 is a schematic view of a core computing unit according to one embodiment of the invention.

FIG. 4 is a schematic view of a core computing unit according to the invention. An access network 20 catches a packet 50 transmitted from user equipment 10. It is then routed through the telecom network and eventually ends up passing into the network core 30 and to a core computing unit 36 through a network interface 34. The core computing unit 36 is a computing unit located in the network core 30 adapted to perform various actions on the traffic on the telecom network.

The core computing unit 36 has a processor 33 for carrying out instructions and a memory 35 for storing data necessary for the fulfilment of the instructions. The core computing unit 36 further has an action database 31 and other databases 32 at least associated and can consult these. When the packet arrives in the core computing unit 34, and after the telecom encryption has been decrypted, the action database 31 is consulted to find out what the core computing unit 36 is supposed to do with the specific packet 50. Such an action can be principally unique for all subscriber identities, or a single action or set of actions can be attributed to a series of subscriber identities, such as if belonging to the same recipient.

When the core computing unit 36 has performed the prescribed actions on the packet 50, the now potentially modified packet 50' is transmitted further to its intended destination.

The invention claimed is:

1. A computer-implemented method comprising:
receiving a packet from user equipment through an access network of a telecommunications network, the packet having a subscriber identity of the user equipment and being encrypted according to protocols of the telecommunications network;
decrypting the packet in a network core of the telecommunications network according to protocols of the telecommunications network, using subscriber-identity-derived keys;
finding, in an action database within the network core, a predetermined action pre-associated with the subscriber identity of the packet; and
performing the predetermined action on the packet in the network core, the predetermined action comprising:
producing a modified packet by modifying payload data of the packet based on the subscriber identity of the user equipment.

2. The method of claim 1, where the predetermined action comprises producing a modified packet by analyzing payload data of the packet and modifying the packet data based on the analysis.

3. The method of claim 1, wherein any further encryption layer of the received packet besides the telecom encryption layer has a key length of 127 bits or fewer.

4. The method of claim 1, where the packet comprises encryption only according to cryptographic protocols of the telecommunications network.

5. The method of claim 1, wherein the received packet comprises an original packet destination, and the pre-determined action comprises supplying the packet with a recipient packet destination being different from, and replacing, any original packet destination of the packet.

6. The method of claim 5, wherein the recipient packet destination is reached through a public internet.

7. The method of claim 1, where the received packet comprises primary sensor data or raw sensor data.

8. The method of claim 1, wherein the predetermined action comprises transforming primary sensor data of the packet to raw sensor data.

9. The method of claim 1, further comprising transmitting the packet over a public internet.

10. The method of claim 1 further comprising providing a publicly accessible communication channel to the action database, wherein the subscriber identity belongs to a user profile, and wherein a user accessing the communication channel using the user profile is allowed to modify the pre-determined action associated with the subscriber identity belonging to the user profile.

11. The method of claim 1, wherein the predetermined action further comprises replacing the subscriber identity in the packet with a mapped identifier from a mapping database, the mapped identifier being specific to the subscriber identity and useful for identifying and/or authenticating the user equipment by a recipient of the packet, after transmission over the public internet.

12. The method of claim 11, wherein the mapped identifier is a key or authenticator compliant with a public internet cryptographic protocol.

13. The method of claim 12, wherein the public internet cryptographic protocol is a Secure Sockets Layer protocol or a Transport Layer Security protocol.

14. A computing unit configured for processing packets in a network core of a telecommunications network, the computing unit comprising a processor and memory, the memory containing instructions that causes the following method to be performed when executed by the processor:

receiving a packet from user equipment through an access network of a telecommunications network, the packet having a subscriber identity of the user equipment and being encrypted according to protocols of the telecommunications network;

decrypting the packet in the network core according to protocols of the telecommunications network, using subscriber-identity-derived keys;

finding, in an action database within the network core, a predetermined action pre-associated with the subscriber identity of the packet; and performing the predetermined action on the packet in the network core, the predetermined action comprising:

producing a modified packet by modifying payload data of the packet based on the subscriber identity of the user equipment.

15. A computer program product comprising a non-transitory computer readable medium containing instructions configured for the computer unit of claim 14.

16. A non-transitory computer-readable storage medium comprising instructions configured to cause a computing unit to carry out the following method, when read and executed by the computing unit:

receiving a packet from user equipment through an access network of a telecommunications network, the packet having a subscriber identity of the user equipment and being encrypted according to protocols of the telecommunications network;

decrypting the packet in a network core according to protocols of the telecommunications network, using subscriber-identity-derived keys;

finding, in an action database within the network core, a predetermined action pre-associated with the subscriber identity of the packet, and performing the predetermined action on the packet in the network core, the predetermined action comprising:

producing a modified packet by modifying payload data of the packet based on the subscriber identity of the user equipment.

17. The non-transitory computer-readable storage medium of claim 16, wherein the predetermined action comprises producing a modified packet by analyzing payload data of the packet and modifying the packet data based on said analysis.

18. The non-transitory computer-readable storage medium of claim 16, wherein any further encryption layer of the received packet besides the telecom encryption layer has a key length of 127 bits or fewer.

19. The non-transitory computer-readable storage medium of claim 16, wherein the packet comprises encryption only according to cryptographic protocols of the telecommunications network.

20. The non-transitory computer-readable storage medium of claim 16, wherein the predetermined action further comprises replacing the subscriber identity in the packet with a mapped identifier from a mapping database, the mapped identifier being specific to the subscriber identity and useful for identifying and/or authenticating the user equipment by a recipient of the packet, after transmission over the public internet.

21. The non-transitory computer-readable storage medium of claim 20, wherein the mapped identifier is a key or authenticator compliant with a public internet cryptographic protocol.

22. The non-transitory computer-readable storage medium of claim 21, wherein the public internet cryptographic protocol is a Secure Sockets Layer protocol or a Transport Layer Security protocol.

\* \* \* \* \*